(12) United States Patent
Yamamoto

(10) Patent No.: US 8,994,995 B2
(45) Date of Patent: Mar. 31, 2015

(54) IMAGE PROCESSING DEVICE AND CONVERSION PROGRAM

(71) Applicant: Hiroyuki Yamamoto, Kasugai (JP)

(72) Inventor: Hiroyuki Yamamoto, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 115 days.

(21) Appl. No.: 13/849,847

(22) Filed: Mar. 25, 2013

(65) Prior Publication Data

US 2013/0321649 A1 Dec. 5, 2013

(30) Foreign Application Priority Data

May 29, 2012 (JP) ................. 2012-122066

(51) Int. Cl.
G06F 3/12 (2006.01)
H04N 5/232 (2006.01)
(52) U.S. Cl.
CPC .......... H04N 5/23229 (2013.01); G06F 3/1211 (2013.01); G06F 3/1247 (2013.01); G06F 3/1288 (2013.01)
USPC ........................... 358/1.15; 358/1.9; 358/1.14
(58) Field of Classification Search
None
See application file for complete search history.

(56) References Cited

U.S. PATENT DOCUMENTS 6,094,276 A * 7/2000 Yamaguchi et al. ......... 358/1.15
6,633,400 B1 * 10/2003 Sasaki et al. ................ 358/1.15
8,885,186 B2 * 11/2014 Matsuda ...................... 358/1.13
2001/0043355 A1 * 11/2001 Bando .......................... 358/1.15
2005/0057766 A1 * 3/2005 Delaplace et al. ........... 358/1.12
2008/0209419 A1 * 8/2008 Maeda .......................... 718/100
2009/0059275 A1 * 3/2009 Tomita ......................... 358/1.15
2010/0225966 A1 * 9/2010 Bailey et al. ................. 358/1.15
2011/0019226 A1 * 1/2011 Tsujimoto .................... 358/1.15
2011/0279837 A1 11/2011 Muramatsu
2014/0002845 A1 * 1/2014 Gutnik et al. ................ 358/1.14

FOREIGN PATENT DOCUMENTS

JP 2011-188198 A 9/2011

* cited by examiner

Primary Examiner — Dung Tran
(74) Attorney, Agent, or Firm — Scully, Scott, Murphy & Presser PC

(57) ABSTRACT

An image processing device includes: an acquisition unit; an image processing unit; a communication unit configured to communicate with a server configured to convert a pre-conversion partial data into post-conversion partial data; a memory configured to store the post-conversion partial data and correspondence information; and a controller configured to: determine whether the post-conversion partial data corresponding to the pre-conversion partial data is stored in the memory; transmit the pre-conversion partial data to the server; receive the post-conversion partial data; control the image processing unit to process the post-conversion partial data received from the server if the corresponded post-conversion partial data is not stored in the memory; control the image processing unit to process the post-conversion partial data stored in the memory if the corresponded post-conversion partial data is stored in the memory; and store the post-conversion partial data received from the server, and the correspondence information.

7 Claims, 12 Drawing Sheets

IMAGE PROCESSING DEVICE AND CONVERSION PROGRAM

CROSS-REFERENCE TO RELATED APPLICATION

This application claims priority from Japanese Patent Application No. 2012-122066 filed on May 29, 2012, the entire subject matter of which is incorporated herein by reference.

TECHNICAL FIELD

This disclosure relates to a technique for transmitting an image processing job to a server, converting the image processing job, and processing the converted image processing job.

BACKGROUND

There is an image processing device capable of transmitting image data to a server and converting that, and then processing the image data converted by the server.

Further, there is a technique for reusing the image data converted once, so as to suppress the server from repeatedly converting the dame image data.

Specifically, for example, a first image forming apparatus transmits the image data to an image processing server, and the image processing server converts and transmits the received image data to the first image processing device, and simultaneously transmits a short cut to refer to the image data to a second image forming apparatus as the same model as the first image forming apparatus. If the second image forming apparatus prints the image data, the second image forming apparatus refer to the short cut and then receives and prints the converted image data corresponding to the image data from the first image forming apparatus.

SUMMARY

However, after the image data is converted by the server, a user may change a portion of the image data.

According to the above device, if even a portion is changed, the whole image data should be transmitted to the server for the conversion, so that a load applied to the server and a communication load are increased.

Accordingly, this disclosure provides at least an image processing device, in which a load to be applied to the server is suppressed, as compared with a case where all the pre-conversion partial data is transmitted to the server and are reconverted by the server, in a case where pre-conversion partial data configuring an image processing job is converted by a server and then a portion of the pre-conversion partial data is changed by a user.

In view of the above, an image processing device of this disclosure, comprises: an acquisition unit configured to acquire an image processing job configured by at least one of pre-conversion partial data; an image processing unit; a communication unit configured to communicate with a server configured to convert the pre-conversion partial data into post-conversion partial data which is to be processed by the image processing unit; a memory configured to store the post-conversion partial data and correspondence information that indicates a correspondence between the pre-conversion partial data used for conversion of the post-conversion partial data and the post-conversion partial data; and a controller. The controller is configured to determine, with reference to the correspondence information, whether the post-conversion partial data corresponding to the pre-conversion partial data is stored in the memory, for each of the pre-conversion partial data configuring the image processing job acquired by the acquisition unit; transmit the pre-conversion partial data, which is determined that the corresponded post-conversion partial data is not stored in the memory, to the server; receive the post-conversion partial data from the server corresponding to the transmitted pre-conversion partial data; control the image processing unit to process the post-conversion partial data received from the server if the pre-conversion partial data is determined that the corresponded post-conversion partial data is not stored in the memory; control the image processing unit to process the post-conversion partial data stored in the memory if the pre-conversion partial data is determined that the corresponded post-conversion partial data is stored in the memory; and store the post-conversion partial data received from the server, and the correspondence information that indicates the correspondence between the pre-conversion partial data used for conversion of the post-conversion partial data and the post-conversion partial data.

According to the image processing device, among the pre-conversion partial data configuring the image processing job, the pre-conversion partial data, of which the corresponded post-conversion partial data is not stored in the server, is transmitted to the server. Accordingly, in the case where a portion of the pre-conversion partial data is changed, only the changed pre-conversion partial data is transmitted to the server if the user changes the pre-conversion partial data after the pre-conversion partial data configuring the print job is converted by the server. According to the image processing device, in the case where the user changes the pre-conversion partial data after the pre-conversion partial data configuring the print job is converted by the server, it is possible to suppress a load applied to the server, as compared with a case where all the pre-conversion partial data are transmitted to the server for re-conversion.

Meanwhile, an image processing device in another aspect of this disclosure, comprising: an acquisition unit configured to acquire an image processing job configured by at least one of pre-conversion partial data; an image processing unit; a communication unit configured to communicate with a server configured to convert the pre-conversion partial data into post-conversion partial data which can be processed by the image processing unit; and a controller configured to: transmit correspondence information that indicates a correspondence between the pre-conversion partial data and the post-conversion partial data, for each pre-conversion partial data configuring the image processing job acquired by the acquisition unit, to the server to inquire whether conversion is necessary or not receive a reply of the inquiry from the server; transmit the pre-conversion partial data, of which it is replied that the conversion is necessary, to the server; receiving the post-conversion partial data corresponding to the correspondence information transmitted from the server; and control the image processing unit to process the post-conversion partial data received from the server.

Meanwhile, a non-transitory computer-readable medium in another aspect of this disclosure, storing instructions, when executed by a computer, to cause the computer to execute: receiving correspondence information that indicates a correspondence between pre-conversion partial data and post-conversion partial data from an image processing device connected with the computer; determining whether the post-conversion partial data, which is corresponded by the correspondence information received from the image processing device, is stored in memory included in the computer;

transmit, if the corresponded post-conversion partial data is stored in the memory, a reply that conversion is not necessary; transmit, if the corresponded post-conversion partial data is not stored in the memory, a reply that conversion is necessary; receive the pre-conversion partial data from the image processing device; convert the pre-conversion partial data received from the image processing device into the post-conversion partial data; transmit the converted post-conversion partial data to the image processing device if the correspondence information is replied that the conversion is necessary; transmit the post-conversion partial data corresponding to the correspondence information of the post-conversion partial data stored in the memory, to the image processing device if the correspondence information is replied that the conversion is not necessary; and store the converted post-conversion partial data and the correspondence information that indicates the correspondence between the pre-conversion partial data used for the conversion of the post-conversion partial data and the post-conversion partial data in the memory.

The technique disclosed herein can be embodied in various aspects, such as an information processing device, an information processing system, a driver control method, and a driver control program.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Illustrative Embodiment 1

Figure 1:
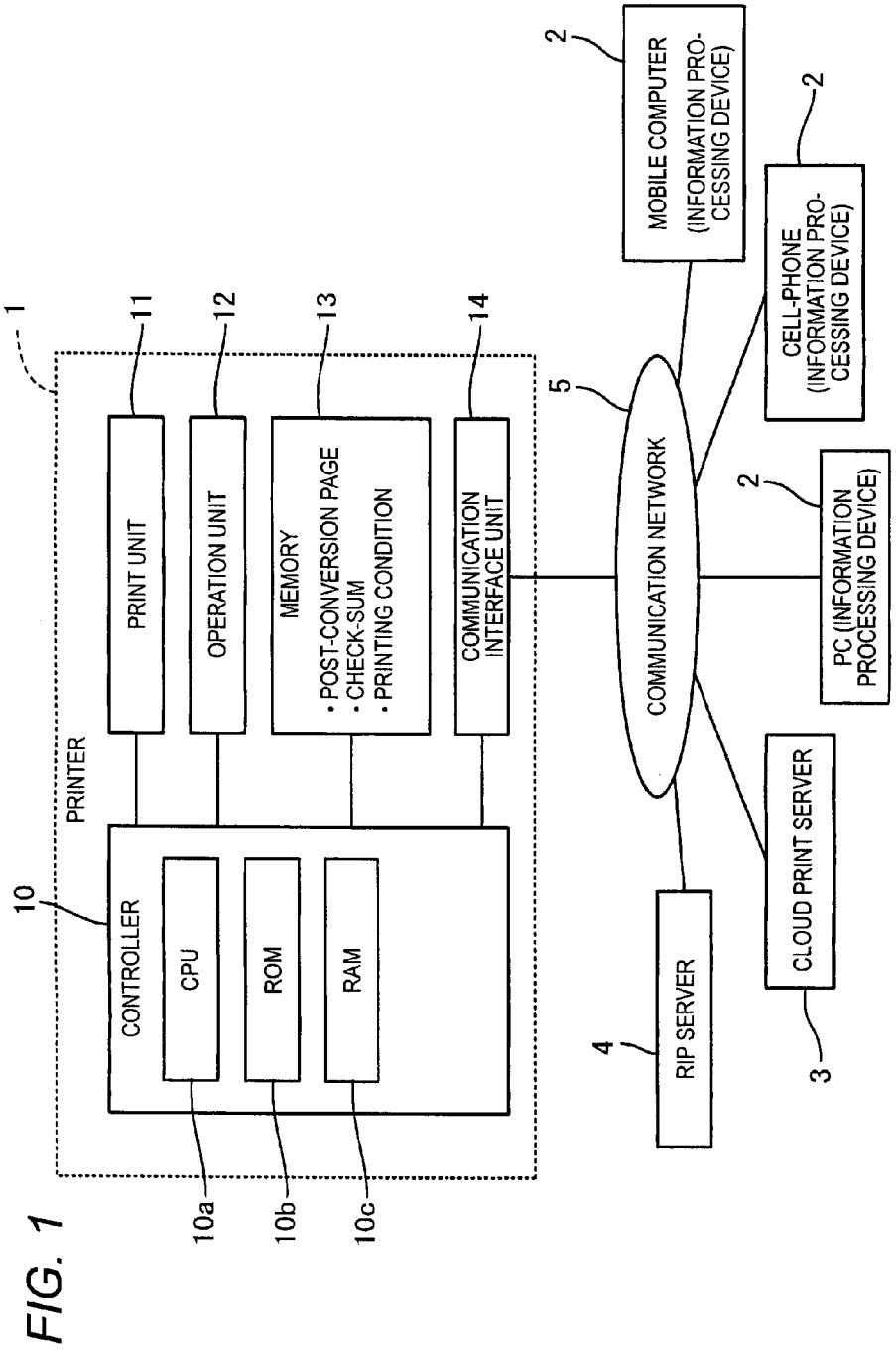
FIG. 1 is a block diagram schematically illustrating the electrical configuration of a printer according to the first illustrative embodiment.

The first illustrative embodiment will be described with reference to FIGS. 1 to 7.

(1) Electrical Configuration of Printer

First, an electrical configuration of a printer 1, which is an image processing device, will be described with reference to FIG. 1. The printer 1 includes a controller 10, a printing unit 11, an operation unit 12, a memory 13, and a communication interface unit 14.

The controller 10 includes a CPU 10a, a ROM 10b, and a RAM 10c. The CPU 10a controls all units of the printer 1 by executing a program stored in the ROM 10b or the memory 13. Further, the CPU 10a functions as a software clock by executing a desired program. Various programs or data executed by the CPU 10a are stored in the ROM 10b. The RAM 10c is used as a main memory for the CPU 10a to execute various processing.

The printing unit 11 is a device for printing an image on a sheet, such as print paper, by an electrographic method or an ink-jet method. The printing unit 11 is one example of an image processing unit.

The operation unit 12 includes a display device, such as a liquid crystal display, or various operation buttons. A user can set an operation of the printer 1 by operating the operation unit 12.

The memory 13 is a device for storing various programs and data using a hard disc or a nonvolatile memory such as a flash memory. The memory 13 stores a post-conversion page, a check-sum, and a print condition. Further, the printer 1 may be configured to store such data in a file server (not illustrated) connected to a communication network 5.

The communication interface unit 14 is an interface for communicating with peripheral devices via the communication network 5 such as an LAN (Local Area Network) or Internet. The communication interface unit 14 may be communicated with the peripheral device via a cable, or may be wirelessly communicated with it. The communication interface unit 14 is one example of an acquisition unit and a communication unit.

As illustrated in FIG. 1, an information processing device 2, such as a personal computer (PC), a cell-phone, and a mobile computer, a cloud print server 3, and a RIP (Raster Image Processor) server 4 are connected to the communication network 5 connected to the printer 1.

(2) Cloud Print

Figure 2:
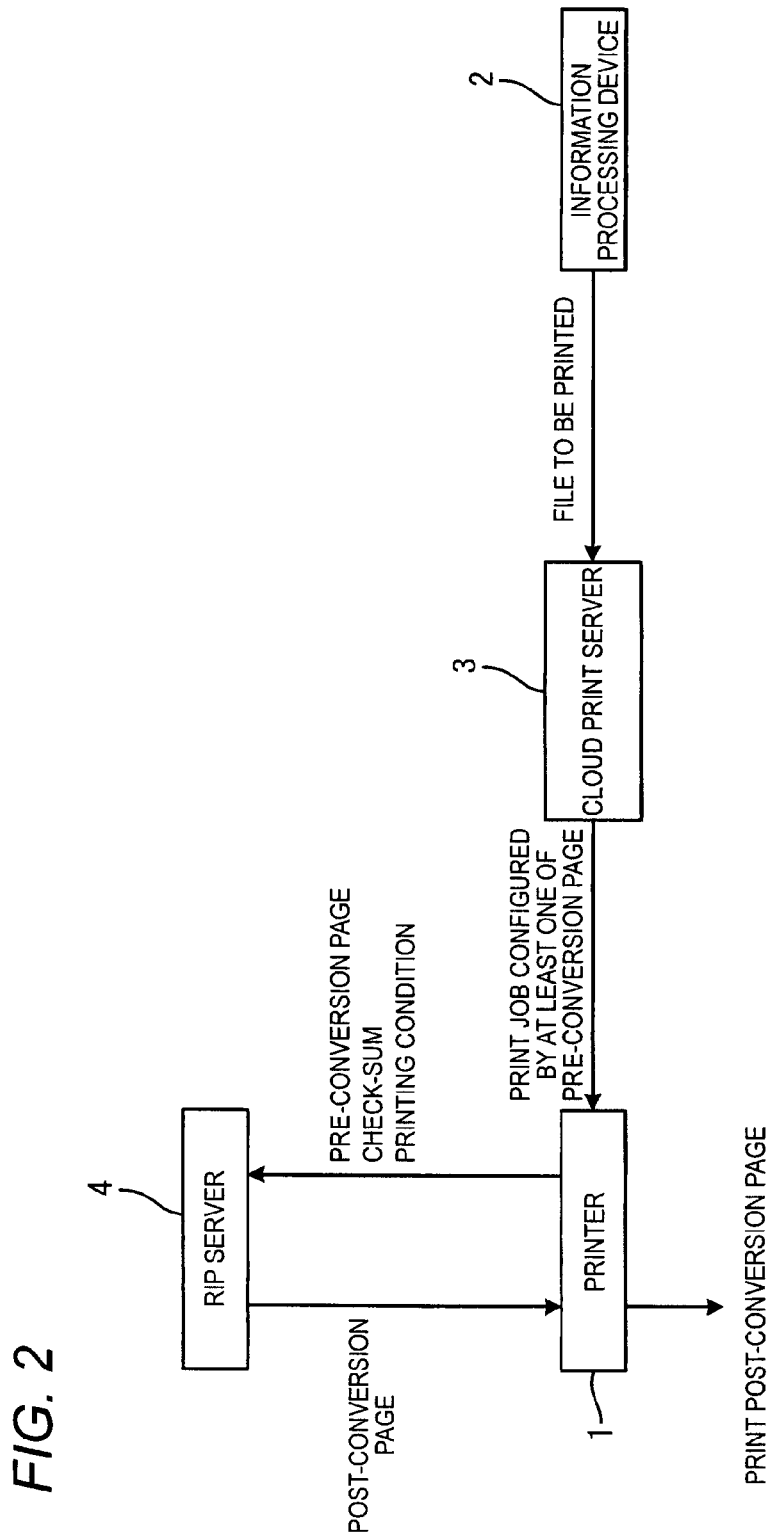
FIG. 2 is a diagram of a cloud print.

Then, the cloud print using the printer 1 will be described with reference to FIG. 2. The cloud print means to controls the printer 1 to execute the printing via the communication network 5 from the information processing device 2.

In the cloud print, a file to be printed is transmitted to the cloud print server 3 from the information processing device 2. A format of the file to be printed will be a format to be interpreted by the cloud print server 3. This file is to be stored at least one of page.

When the file to be printed is transmitted to the cloud print server 3, the information processing device 2 designates a printer executing the printing, and simultaneously, designates a print condition. In this case, the printer 1 is designated. Further, the print condition means a combination of set values of print setting items, such as color/monochrome, resolution, layout, the number of print pages, and single-sided/double-sided printing. The layout is the number of pages on which one surface of one sheet is printed, and may be set to a value such as 1, 2, 4, or 9. The print condition is one example of an image processing condition.

When the cloud print server 3 receives the file to be printed from the information processing device 2, the cloud print server converts the received file into a PDF (Portable Document Format), and generates a print job from the converted PDF file. The print job is stored with the converted PDF file and the print condition specified by the information processing device 2. The cloud print server 3 transmits the print job to the printer 1 designated by information processing device 2.

In the following description, each page stored with the PDF file is referred to as a pre-conversion page because the PDF file has not been converted by the RIP server 4. The pre-conversion page is one example of a pre-conversion partial data. Further, the print job is one example of an image processing job.

Herein, a case where the file to be printed is converted into the PDF file is described as an example, but the format of the file converted by the cloud print server 3 is not limited to the PDF. Other formats, such as JPEG, TIFF, or bit map, are available.

When the printer 1 receives the print job from the cloud print server 3, the printer reads the pre-conversion page from the PDF file stored in the received print job, and transmits the read page to the RIP server 4 to request the conversion. Then, the printer 1 transmits the print condition set in the print job to the RIP server 4.

The RIP server 4 is a server capable of converting the pre-conversion page received from the printer 1 into raster data, and replying it to the printer 1. The conversion is performed according to the print condition received from the printer 1. In the following description, the page which is converted by the RIP server 4 is referred to as a post-conversion page. The post-conversion page is one example of a post-conversion partial data. Further, the RIP server 4 is one example of the server Herein, a well-known RIP server may be used as the RIP server 4 according to the first illustrative embodiment. Similarly, a well-known cloud print server 3 may be used.

When the printer 1 receives the post-conversion partial data from the RIP server 4, the printer prints the post-conversion partial data.

Additionally, the printer 1 may be configured to carry out a so-called pull print. The pull print means that the printer 1 requests the cloud printer server 3 for transmission of the print job, and prints the print job received from the cloud print server 3.

(3) Memorize of Post-Conversion Partial Data

There is a case where the user may change only a portion of the page configuring the file to be printed by the cloud print at a previous stage, and again cloud-print it. Here, if all the pre-conversion pages are transmitted to the RIP server 4, the all pages are to be conversional despite that the contents of the pages except for a page corresponding to a portion of the page are not changed. Thereby, a load of the RIP server 4 and a communication load are increased.

With considering the above, when the printer 1 receives the post-conversion page from the RIP server 4, the printer stores the post-conversion page in the memory 13. After that, when the printer 1 receives the print job, the printer does not transmit the pre-conversion page which is identical to the pre-conversion page used for the conversion of the post-conversion page stored in the memory 13, and thus prints the pre-conversion page stored in the memory 13.

Figure 3:
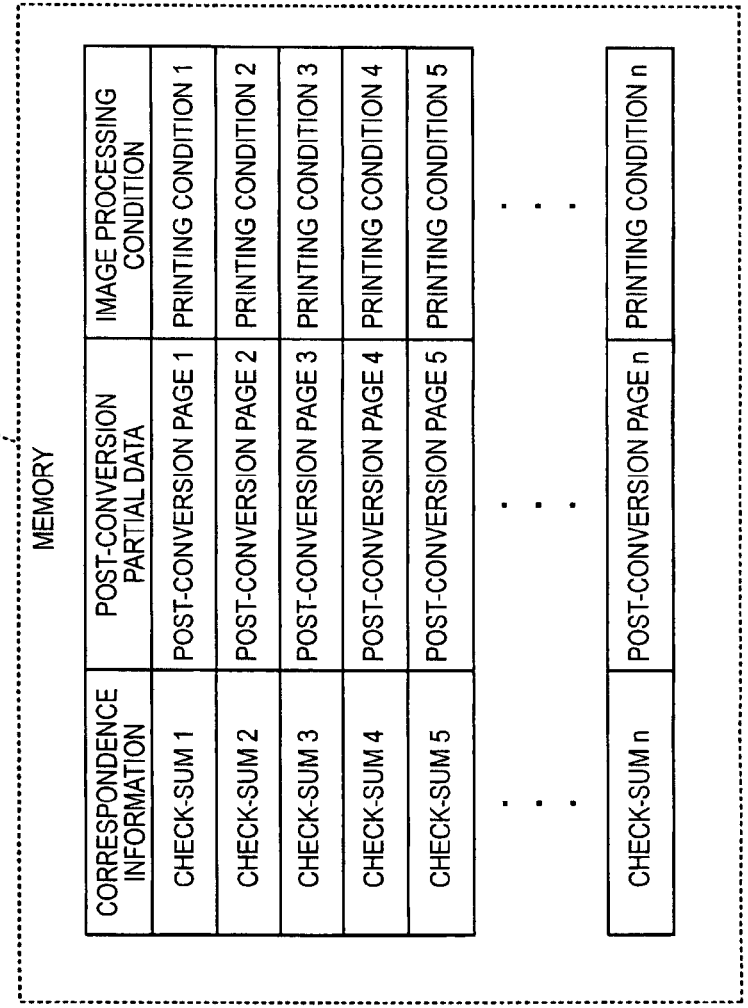
FIG. 3 is a diagram illustrating a post-conversion data stored in a memory.

The post-conversion page stored in the memory 13 will be described in detail with reference to FIG. 3. The printer 1 store not only the post-conversion page in the memory 13, but also correspondence information and the print condition set to the print job, in which the pre-conversion page used for the conversion of the post-conversion page, is stored with corresponding each other.

The correspondence information is information that indicates a correspondence between the pre-conversion page used for the conversion of the post-conversion partial data with the post-conversion partial data. As the correspondence information, it is used that information becomes the same value if the contents of the page is identical to each other and but becomes a different value if the contents of the page are different. Such information is used as the correspondence information, so that if the printer 1 receives the pre-conversion page, the printer specifies the post-conversion partial data which is converted by using the pre-conversion page having the same contents as the pre-conversion page.

For example, a check-sum may be used as the correspondence information. The check-sum is a kind of error detection code. In the simple check-sum, data is regarded as a numerical value in a byte unit, and an added value thereof is used. In case that the calculated check-sum of the pre-conversion page is the same check-sum corresponding to the post-conversion page, it is determined that the post-conversion page generated from the pre-conversion page having the same contents as the pre-conversion page.

Additionally, even if the contents of the page are different, the check-sum may be identical to each other. But, the probability is extremely small in general. Accordingly, it may be said that there is no problem in practical use even using the check-sum.

As described above, the post-conversion page is stored with the print condition with being corresponded to each other. The print condition and the correspondence are stored, because even if the post-conversion page converted by using the pre-conversion page having the same contents as the received pre-conversion page is stored, if the print condition set in the print job that stores the pre-conversion page is different from the print condition used for the conversion of the post-conversion page, the post-conversion page cannot be used as it is.

(4) Printing Operation of Printer

Next, the printing operation of the printer 1 in the cloud print will be described. First, the printing operation of the printer 1 will be described conceptually with reference to FIG. 4, and then the flow of the printing operation will be described.

Figure 4:
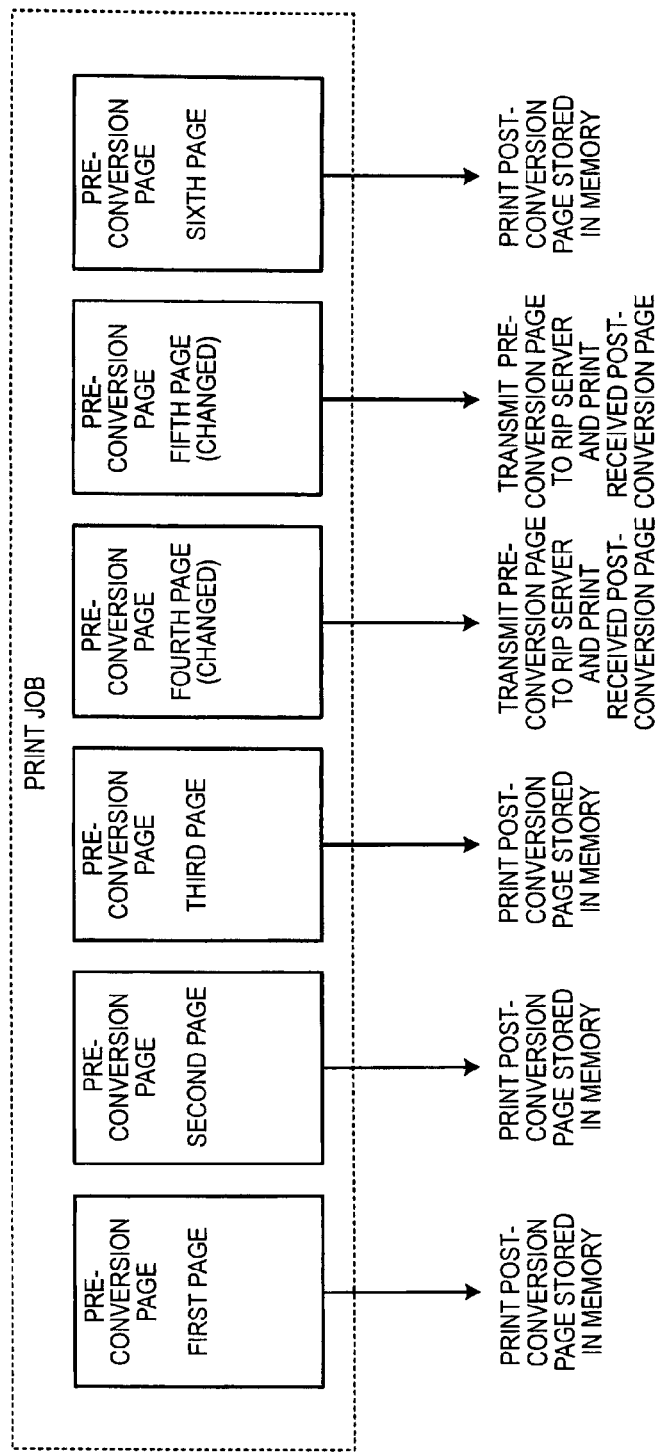
FIG. 4 is a diagram illustrating one example of a print job.

FIG. 4 shows the print job stored with the PDF file of 6 pages. Further, FIG. 4 shows the print job stored with the PDF file converted from the file to be printed, and it has been printed once by the cloud print. But, the contents of the fourth and fifth pages are changed by the user after the previous printing.

In the case of the example illustrated in FIG. 4, for the first to third pages and the sixth page, the post-conversion pages corresponding to the check-sum identical to the check-sum which is calculated from these pages are stored in the memory 13. Accordingly, these pages are not transmitted to the RIP server 4, and the post-conversion pages stored in the memory 13 are printed.

In contrast, since the contents of the fourth and fifth pages are changed, the check-sum calculated from these pages is not identical to the check-sum corresponding to any post-conversion page stored in the memory 13. Then, the printer 1 determines that the post-conversion pages are not stored in the memory 13 for the fourth and fifth pages, and thus transmits two pages to the RIP server 4 to request the conversion thereof. The printer 1 prints the post-conversion page received from the RIP server 4.

In the above case, the post-conversion page is not transmitted to the RIP server 4 in the case where the check-sum is identical to each other, but the print condition is also used when determining whether the pre-conversion page is transmitted to the RIP server 4. The reason is that, if the condition is different in the case where the pre-conversion page is identical to each other, the stored post-conversion page cannot be used as it is, as described above. Accordingly, even if the check-sums are identical to each other, the pre-conversion page having the different print condition is transmitted to the RIP server 4.

Additionally, even if the print condition is different from each other, the pre-conversion page may be not transmitted to the RIP server 4. The reason is that since the post-conversion page is modified based on the print condition (hereinafter, referred to as a current print condition) set in the print job, the same post-conversion page as the case in which the pre-conversion page and the current print condition is transmitted to the RIP server 4 may be obtained.

For example, a set value of color/monochrome of the print condition corresponding to the post-conversion page, of which the check-sum is identical to a current check-sum, is color, and a set value of color/monochrome of the current print condition is monochrome. When the post-conversion page is modified, the post-conversion page to be printed in the monochrome can be processed. Accordingly, so as to suppress the load of the RIP server 4, the printer 1 does not transmit the pre-conversion page to the RIP server 4, but modifies the post-conversion page to print the page in the monochrome.

On the contrary, in the case where the previous print condition is monochrome, and but the current print condition is color, it is difficult to modify the same post-conversion page as the case where the pre-conversion page and the current print condition is transmitted to the RIP server 4. In this case, the printer 1 transmits the pre-conversion page and the current print condition to the RIP server 4 to convert it.

Similarly, even if the resolution of the current print condition is lower than that of the print condition corresponding to the post-conversion page, of which the check-sum is identical to a current check-sum, the modification is possible. Further, even if a set value of the layout of the current print condition is larger than that of the layout of the print condition corresponding to the post-conversion page, of which the check-sum is identical to a current check-sum, the modification is possible. The reason is that the large value means that the printing is carried out in low resolution.

Figure 5:
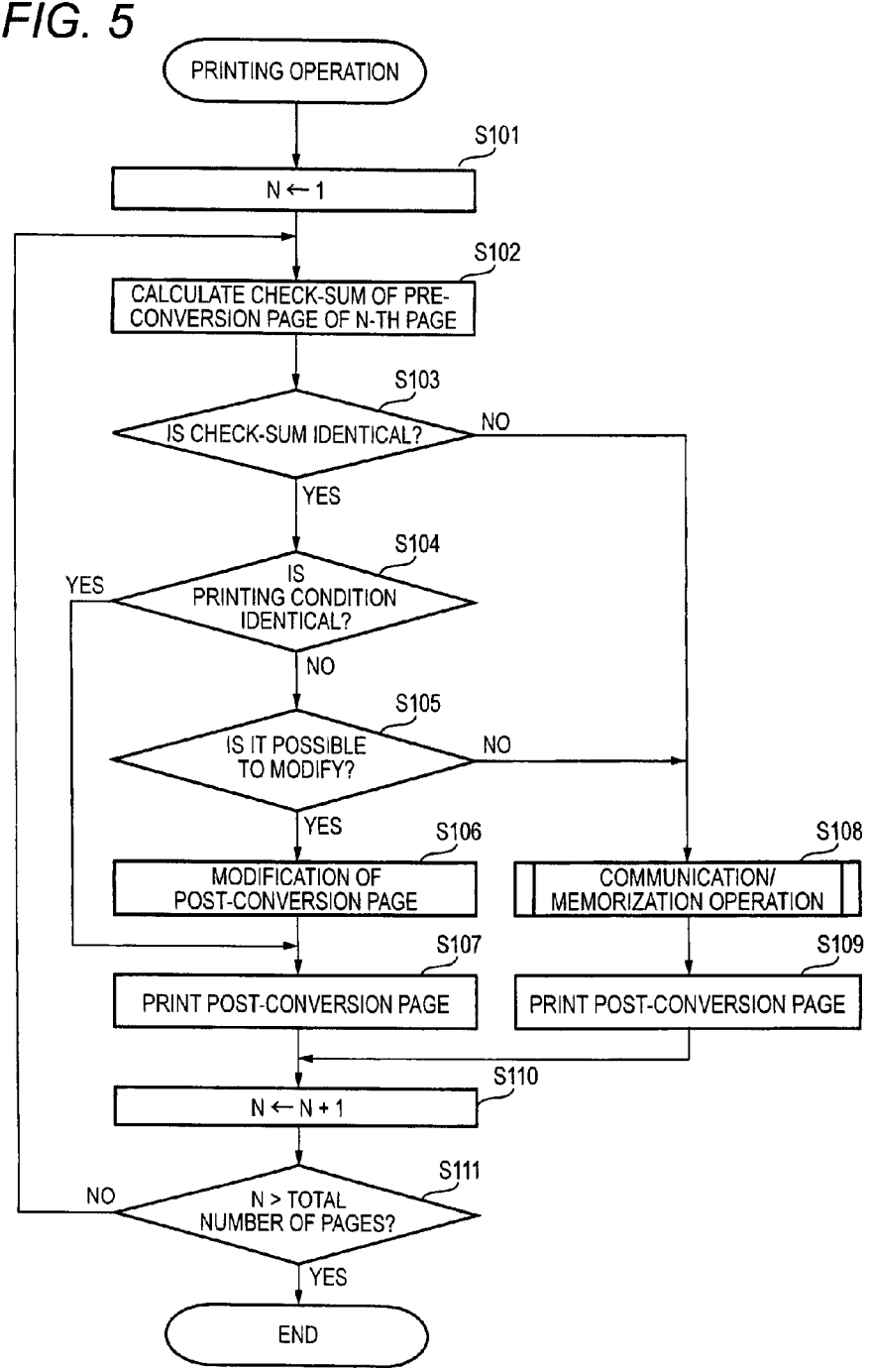
FIG. 5 is a flowchart illustrating a flow of a print operation.

Next, the flow of the printing operation of the printer 1 will be described with reference to FIG. 5. The operation is started if the printer 1 receives the print job from the cloud print server 3.

In step S101, the CPU 10*a* sets an initial value as 1 for a variable number N counting the number of pages.

In step S102, the CPU 10*a* calculates the check-sum of the pre-conversion page of the N-th page.

In step S103, the CPU 10*a* determines whether the post-conversion page corresponding to the pre-conversion page of the N-th page is stored in the memory 13 with reference to the check-sum.

Specifically, the CPU 10*a* compares the check-sum calculated in step S102 with the check-sum corresponding to each post-conversion page stored in the memory 13 to determine whether there is the post-conversion page corresponding to the check-sum identical to the check-sum calculated in step S102. Step S103 is one example of a post-conversion partial data presence/absence determining operation.

The CPU 10*a* proceeds to step S104, if there is the post-conversion page, of which the check-sum is identical to a current check-sum, and proceeds to step S108 if there is no post-conversion page, of which the check-sum is identical to a current check-sum.

In step S104, the CPU 10*a* determines whether the print condition set in the received print job is identical to the print condition corresponding to the post-conversion page which is determined that the check-sum is identical to each other in step S103. It proceeds to step S105 if the print condition is identical to each other, while it proceeds to step S107 if the print condition is not identical to each other. Step S104 is one example of an image processing condition determining operation.

In step S105, the CPU 10*a* determines whether the post-conversion page, of which the check-sum is identical to a current check-sum, can be obtained by modifying based on the current print condition as the same post-conversion page as the case where the pre-conversion page of the N-th page and the current print condition is transmitted to the RIP server 4. The CPU 10*a* proceeds to step S106 if the processing is possible, while proceeds to step S108 if the processing is not possible. Step S105 is one example of a processing determining operation.

In step S106, the CPU 10*a* modifies the post-conversion page, of which the check-sum is identical to a current check-sum, based on the current print condition.

In step S107, the CPU 10*a* prints the post-conversion page. In this printing, the post-conversion page corresponding to the check-sum, which is identical to the check-sum of the pre-conversion page of the N-th page stored in the memory 13, or the page of the post-conversion page modified in step S106 is printed. Step S107 is one example of a control operation.

In step S108, the CPU 10*a* executes a communication/memorization operation. The communication/memorization operation is an operation of carrying out an operation of transmitting the pre-conversion page, which is determined that there is no identical post-conversion page in step S103, to the RIP server 4 and receiving the post-conversion page from the RIP server 4, and an operation of storing the post-conversion page received from the RIP server 4 and the check-sum corresponding to the pre-conversion page used for the conversion of the post-conversion page in the memory 13, with being corresponded to each other. The communication/memorization operation is one example of a communication operation and a memory operation.

In step S109, the CPU 10*a* prints the post-conversion page. In this printing, the post-conversion page stored in the memory 13 is not printed, but the post-conversion page received in step S108 is printed. Step S109 is one example of the control operation.

In step S110, the CPU 10*a* adds 1 to the variable number N.

In step S111, the CPU 10*a* determines whether the variable number N is larger than the total number of pages stored in the print job. If the variable number N is larger than the total number of pages, it is regarded that the operation for all the pages is completed, and then the operation is finished. If the variable number N is equal to or less than the total number of pages, it returns to step S102 to repeat the operation.

(5) Communication/Memorization Operation

Figure 6:
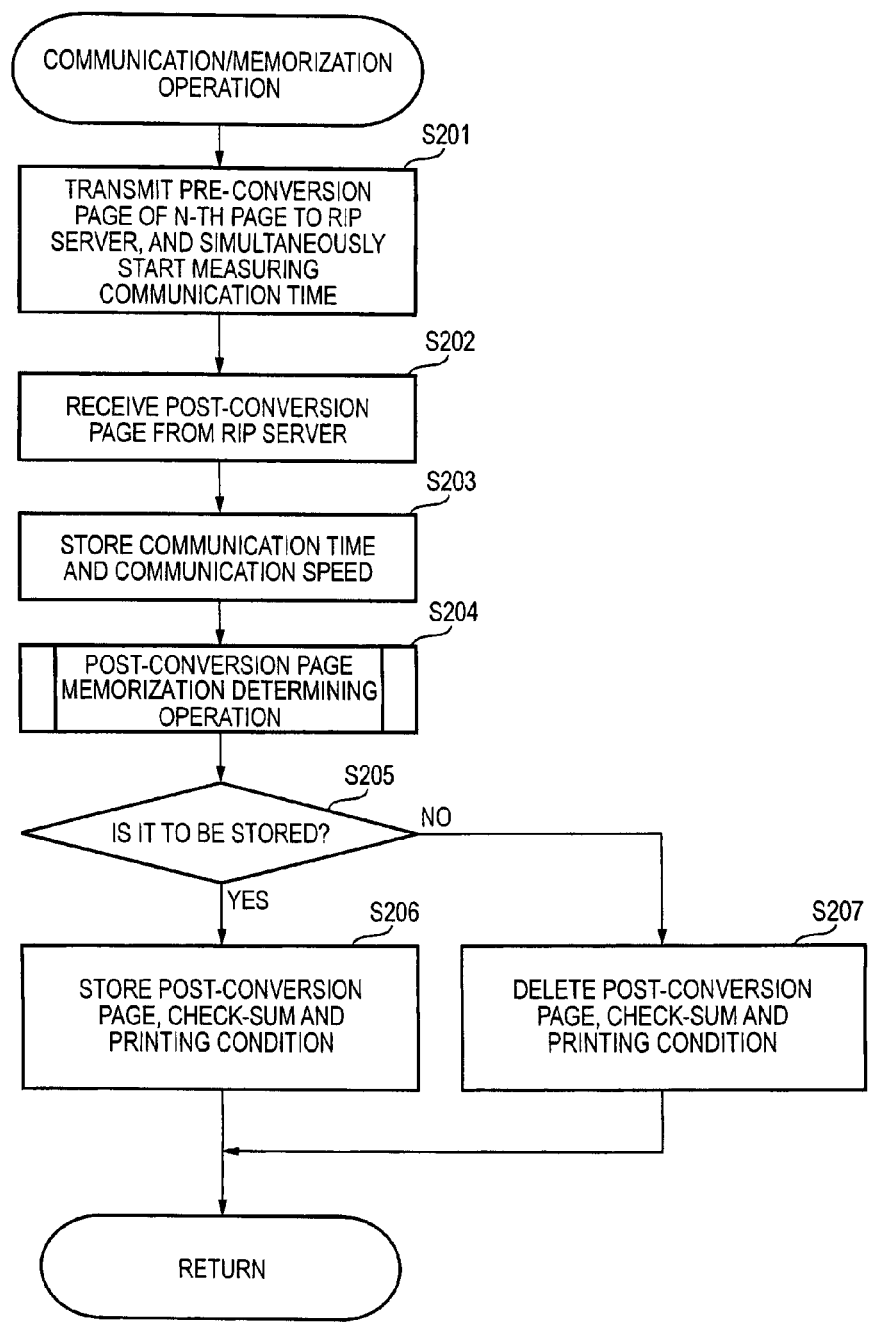
FIG. 6 is a flowchart illustrating a flow of a communication/memorization operation.

Next, the communication/memorization operation carried out in step S108 will be described with reference to FIG. 6.

In step S201, the CPU 10*a* transmits the pre-conversion page of the N-th page to the RIP server 4. With this, the CPU 10*a* starts measurement of a communication time until receiving the post-conversion page after the pre-conversion page is transmitted. The operation of measuring the communication time by the CPU 10*a* is one example of a communication time measuring operation and a communication speed measuring operation.

In step S202, the CPU 10*a* receives the post-conversion page from the RIP server 4.

In step S203, the CPU 10*a* stores the communication time in the RAM 10*c*, and stores the transmission speed (byte/second) per 1 byte which is made by dividing the communication time by the sum size of a data size of the pre-conversion page and a data size of the post-conversion page.

In step S204, the CPU 10a executes the post-conversion page memorization determining operation. The post-conversion page memorization determining operation determines whether the post-conversion page is stored in the memory 13, according to a preset determinment reference. Although it will be described in detail later, if it is determined in the post-conversion page memorization determining operation that the post-conversion page is stored, a value 'ON' indicating the post-conversion page being stored is set in a post-conversion page memory flag. If it is determined that the post-conversion page is not stored, a value 'OFF' indicating the post-conversion page being not stored is set in the post-conversion page memory flag.

In step S205, the CPU 10a determines whether to store the post-conversion page, with reference to the above-described post-conversion page memory flag. If it is stored, it proceeds to step S206, and if it is not stored, it proceeds to step S207.

In step S206, the CPU 10a associates the post-conversion page received from the RIP server 4 in step S202, the check-sum calculated in step S102, and the current print condition, and then stores them in the memory 13. Step S206 is one example of a memorization operation In step S207, the CPU 10a discards the post-conversion data, the check-sum, and the print condition.

(6) Post-Conversion Page Memorization Determining Operation

The above-described post-conversion page memorization determining operation carried in step S204 is an operation of determining whether to store the post-conversion page received from the RIP server 4 in the memory 13. The reason why the determination is carried out is to save a memory region of the memory 13 while suppressing the load applied to the RIP server 4 or the communication network 5.

As the determination reference to determine whether to store the post-conversion page in the memory 13, the communication time (second) until receiving the post-conversion page after the pre-conversion page is transmitted to the server 4, a data quantity (byte) of the post-conversion page, and the communication speed (byte/second) of the communication line to communicably connect the printer 1 and the RIP server 4 will be described as an example.

If all of a condition that the communication time is equal to or less than a reference time, a condition that the data quantity of the post-conversion page is equal to or less than a reference amount, and a condition that the communication speed is equal to or less than a reference speed are satisfied, the printer 1 determines that it does not store the post-conversion page. If any one of the above conditions is not satisfied, the printer 1 determines that it stores the post-conversion page.

If the communication time is equal to or less than the reference time, since the time required for the conversion in the RIP server 4 may be regarded to be short, a large load may not be applied to the RIP server 4 even though the conversion of the pre-conversion page is again requested to the RIP server 4. Accordingly, the post-conversion page is not stored, so that it is possible to save the memory region while suppressing the load applied to the RIP server 4.

In the case where the data quantity of the post-conversion page is equal to or less than the reference data quantity, a large load may not be applied to the RIP server 4 if the conversion of the pre-conversion page is again requested to the RIP server 4. Accordingly, it is possible to save the memory region while suppressing the load applied to the RIP server 4.

If the communication speed is equal to or more than the reference speed, a large load may not be applied to the communication network 5 if the conversion of the pre-conversion page is again requested to the RIP server 4. Accordingly, it is possible to save the memory region while suppressing the load applied to the communication network 5.

The determination using any of the above-described determination references may be set arbitrarily in advance by a manager of the printer 1 who operates the operation unit 12. Further, the reference value, such as reference time or reference data quantity used for the comparison in the determination reference thereof may, be set by the manager of the printer 1, or may be set fixedly in the printer 1.

Figure 7:
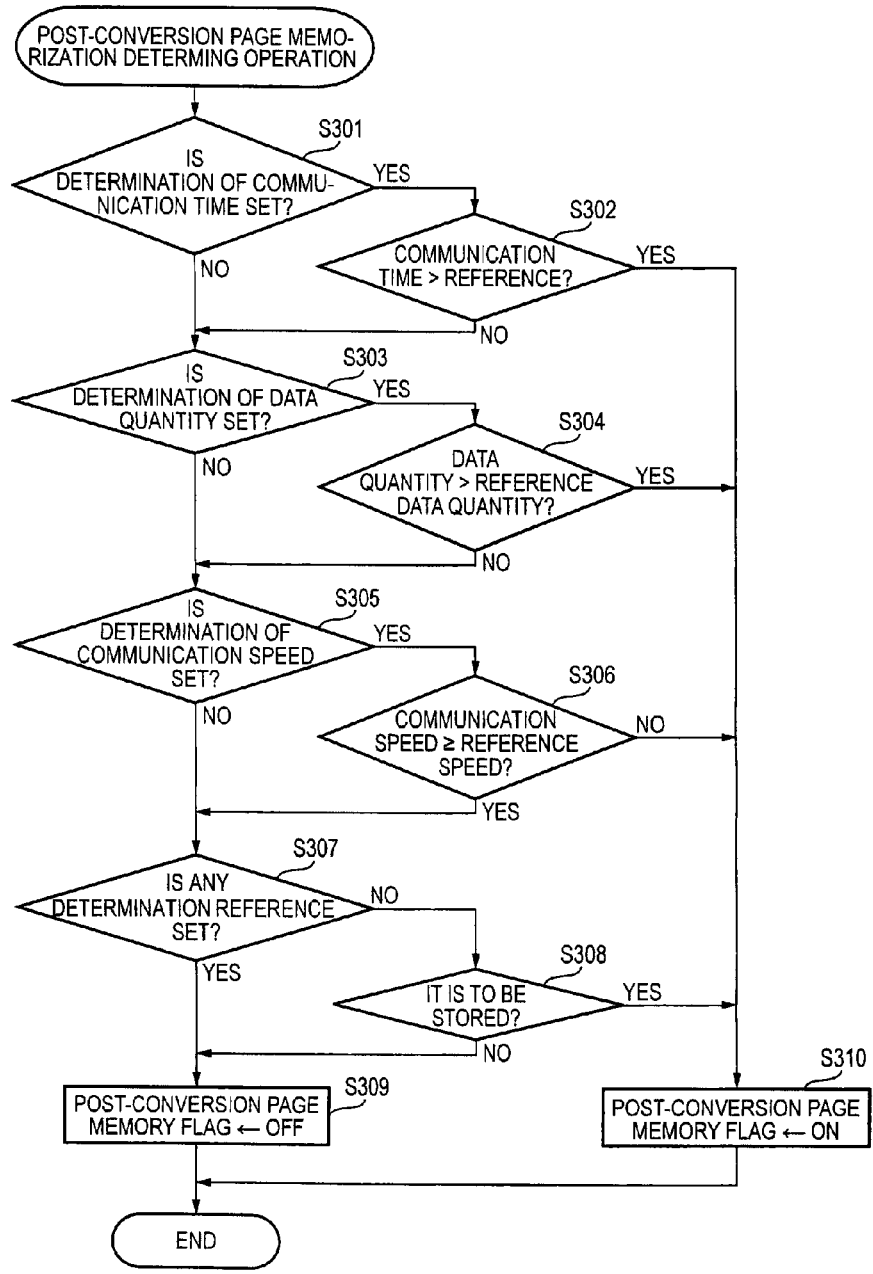
FIG. 7 is a flowchart illustrating a flow of a post-conversion page memorization determining operation.

Then, the flow of the post-conversion page memorization determining operation will be described with reference to FIG. 7.

In step S301, the CPU 10a determines setting to determine whether to store the post-conversion page by the communication time is set or not. If the setting to determine it by the communication time is set, it proceeds to step S302. If the setting is not set, it proceeds to step S303.

In step S302, the CPU 10a determines whether the communication time stored in step S203 is longer than the reference time. If it is equal to or less than the reference time, it proceeds to step S310. If it is longer than the reference time, it proceeds to step S310. Step S302 is one example of a communication time determining operation.

In step S303, the CPU 10a determines whether setting to determine whether to store the post-conversion page by the data quantity of the pre-conversion page is done or not. If the setting to determine it using the data quantity is done, it proceeds to step S304. If the setting is not done, it proceeds to step S305.

In step S304, the CPU 10a determines whether the data quantity of the post-conversion page is more than the reference data quantity. If it is equal to or less than the reference data quantity, it proceeds to step S310. If it is more than the reference data quantity, it proceeds to step S310. Step S304 is one example of a data quantity determining operation.

In step S305, the CPU 10a determines whether setting to determine whether to store the post-conversion page by the communication speed is done or not. If the setting to determine it using the communication speed is done, it proceeds to step S306. If the setting is not done, it proceeds to step S307.

In step S306, the CPU 10a determines whether the communication speed stored in step S203 is more than the reference speed. If it is more than the reference speed, it proceeds to step S307. If it is equal to or less than the reference speed, it proceeds to step S310. Step S306 is one example of a communication speed determining operation.

In step S307, the CPU 10a determines whether any one of the above-described determination references has been set or not. If any one determination reference has been set, it proceeds to step S309. If any one has not been set, it proceeds to step S308.

In step S308, the CPU 10a determines, with reference to a default setting of the printer 1, whether to store the post-conversion page. In the default setting, it is set that any one of 'storing post-conversion page' and 'not storing post-conversion page' has been set. The default setting may be set by the manager, or may be set fixedly in the printer 1.

The CPU 10a proceeds to step S309 if the default setting is "not storing post-conversion page', and it proceeds to step S310 if the default setting is 'storing post-conversion page'.

In step S309, the CPU 10a sets the value 'OFF' indicating the post-conversion page being not stored in the post-conversion page memorization flag.

In step S310, the CPU 10a sets the value 'ON' indicating the post-conversion page being stored in the post-conversion page memorization flag.

(7) Deletion of Post-Conversion Page

The printer 1 deletes the post-conversion page stored in the memory 13 at a predetermined timing. The predetermined timing is a timing when a predetermined time passes after the post-conversion page is stored in the memory 13, or a timing when an free space of the memory 13 becomes less than a reference free space. The timing for deleting the post-conversion page is set by the manager of the printer 1, for example.

(8) Effect of Illustrative Embodiment

According to the printer 1, among the pre-conversion pages configuring the print job, the pre-conversion page, of which the corresponded post-conversion page is not stored in the memory 13, is transmitted to the RIP server 4. Accordingly, in the case where the user changes the file to be printed after the pre-conversion page configuring the print job is converted by the RIP server 4 and a portion of the pre-conversion page is changed, only the changed pre-conversion page is transmitted to the RIP server According to the printer 1, in the case where the user changes the pre-conversion page after the pre-conversion page configuring the print job is converted by the RIP server 4, it is possible to suppress the load applied to the RIP server 4, as compared with the case where all the pre-conversion pages are transmitted to the RIP server 4 for re-conversion.

Further, according to the printer 1, since the check-sum is used as the correspondence information, it is possible to reduce the data quantity of the correspondence information, as compared with the case where the pre-conversion page itself is used as the correspondence information.

Further, according to the printer 1, even when the post-conversion page is stored in the memory 13, the pre-conversion page is transmitted to the RIP server 4 to request for the conversion in the case where the print condition is not identical to each other, so that it is possible to control the RIP server 4 to reconvert the pre-conversion page.

Further, according to the printer 1, even when the print condition corresponded with the post-conversion page corresponding to the pre-conversion page is not identical to the current print condition, the pre-conversion page is not transmitted to the RIP if the same post-conversion page in case that it is converted in the RIP server 4 is obtained by modifying of the post-conversion page based on the current print condition, so that it is possible to suppress the load of the RIP server 4.

Further, according to the printer 1, the post-conversion page is not stored in the memory 13 if the communication time is equal to or less than the reference time, so that it is possible to save the memory region of the memory 13 without the large load applied to the RIP server 4.

Further, according to the printer 1, the post-conversion page is not stored in the memory 13 if the data quantity of the post-conversion page is equal to or less than the reference data quantity, so that it is possible to save the memory region of the memory 13 without the large load applied to the RIP server 4.

Further, according to the printer 1, the post-conversion page is not stored in the memory 13 if the communication speed is equal to or more than the reference speed, so that it is possible to save the storage region of the memory 13 without the large load applied to the communication network 5.

Illustrative Embodiment 2

The second illustrative embodiment will be described with reference to FIGS. 8 to 12.

In the first illustrative embodiment, a case where the post-conversion page is stored in the printer 1 has been described as an example. In contrast, in the second illustrative embodiment, the post-conversion page is stored in the RIP server 6 (see FIG. 8).

(1) Electrical Configuration of Printer

Figure 8:
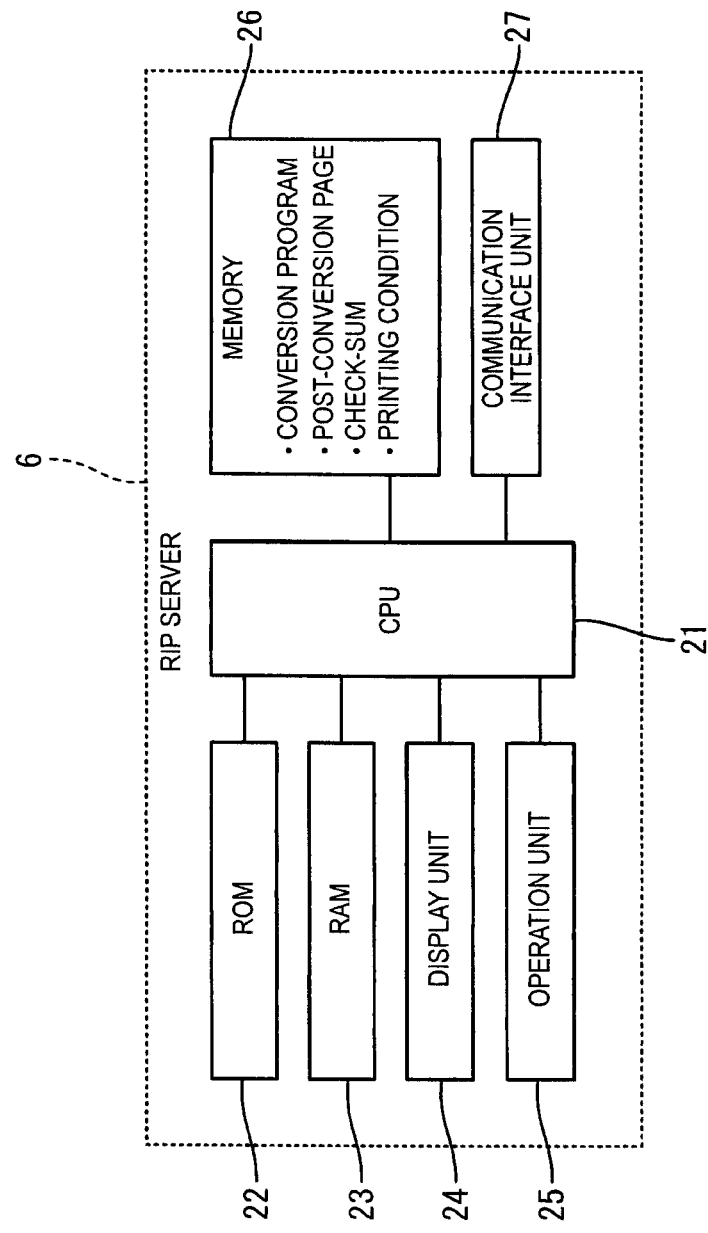
FIG. 8 is a block diagram schematically illustrating the electrical configuration of an RIP server according to the second illustrative embodiment.

First, an electrical configuration of the RIP server 6 will be described with reference to FIG. 8. The RIP server 6 is a computer including a CPU 21, a ROM 22, a RAM 23, a display unit 24, an operation unit 25, a memory 26, and a communication interface unit 27.

The CPU 21 controls all units of the RIP server 6 by executing a program stored in the ROM 22 or the memory 26. Programs or data executed by the CPU 21 are stored in the ROM 22. The RAM 23 is used as a main memory for the CPU 21 to execute various processing.

The display unit 24 includes a display device such as a liquid crystal display, and a display driving circuit for driving the display device.

The operation unit 25 includes a keyboard or a mouse, and an interface connected to the keyboard or mouse.

The memory 26 is a device for storing various programs and data using a hard disc or a nonvolatile memory such as a flash memory. The memory 26 stores a post-conversion page, a check-sum, and a print condition with being corresponded to each other, in addition to a conversion program according to the second illustrative embodiment.

The communication interface unit 27 is an interface for communicating with peripheral devices, such as the printer 1, via the communication network 5.

(2) Printing Operation of Printer

Figure 9:
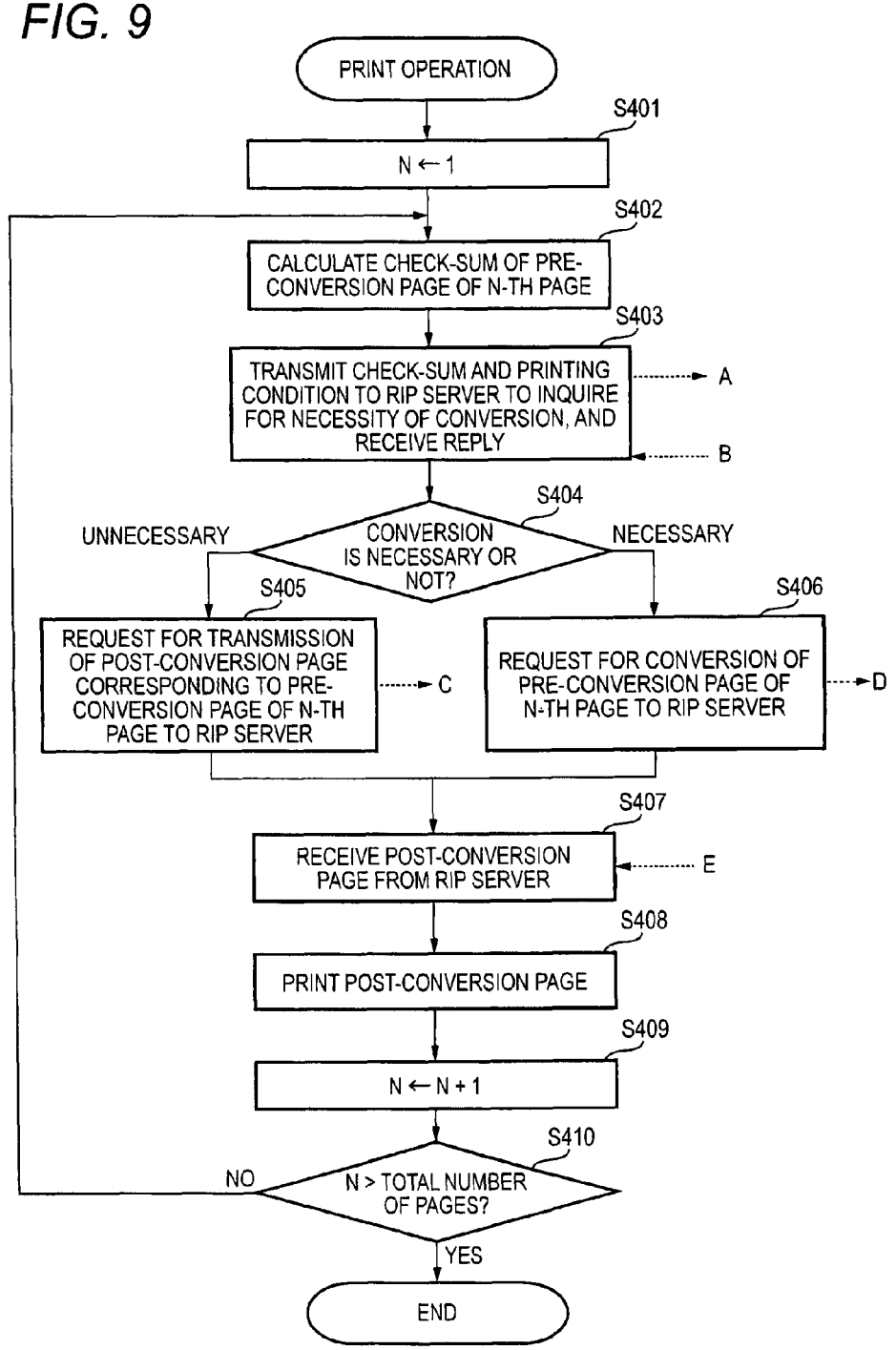
FIG. 9 is a flowchart illustrating a flow of a print operation.

Next, the printing operation of the printer 1 according to the second illustrative embodiment will be described with reference to FIG. 9. The operation starts when the print job is received from the cloud print server 3.

In step S401, the CPU 10a sets 1 as an initial value for a variable number N counting the number of pages.

In step S402, the CPU 10a calculates the check-sum of the pre-conversion page of the N-th page.

In step S403, the CPU 10a transmits the check-sum calculated in step S402 and the current print condition to the RIP server 6, and thus performs an inquiry A of whether the conversion of the pre-conversion page of the N-th page is necessary or not, to the RIP server 6. If the RIP server 6 receives the inquiry A from the printer 1, the RIP server 6 transmits a reply B to the printer 1, and then the printer 1 receives the reply B. Step S403 is one example of an inquiry operation.

In step S404, the CPU 10a determines whether it is replied from the RIP server 6 in step S403 that the conversion is necessary. If it is replied that the conversion is not necessary, it proceeds to step S405, and if it is replied that the conversion is necessary, it proceeds to step S406.

In step S405, the CPU 10a transmits the check-sum calculated in step S403 and the current print condition to the RIP server 6, and thus performs a request C for transmission of the post-conversion page corresponding to the pre-conversion page of the N-th page, to the RIP server 6.

Herein, the reason why the current print condition is transmitted is that the RIP server 6 transmits the reply that the conversion is not necessary even when the same post-conversion page as the case where the post-conversion page and the current print condition is transmitted to the RIP server 4 can be obtained by modifying of the post-conversion page, in which the check-sums are identical to each other, based on the current print condition. Accordingly, the CPU 10a transmits the current print condition with considering the case where the post-conversion page is modified based on the current print condition.

In step S406, the CPU 10a transmits the pre-conversion page of the N-th page, the check-sum calculated in step S402, and the current print condition to the RIP server 6, and thus performs a request D for the conversion of the pre-conversion page of the N-th page to the RIP server 6. Step S406 is one example of a transmission operation.

In step S407, the CPU 10a receives the post-conversion page from the RIP server 6 as the reply E to the request for the transmission of the post-conversion page, or the reply E to the request for the conversion in step S406. Step S407 is one example of a communication operation.

In step S408, the CPU 10a prints the received post-conversion page. Step S408 is one example of a control operation.

In step S409, the CPU 10a adds 1 to the variable number N.

In step S410, the CPU 10a determines whether the variable number N is larger than the total number of pages. If the variable number N is larger than the total number of pages, it is regarded that the operation for all the pages is completed, and then the operation is finished. If the variable number N is equal to or less than the total number of pages, it returns to step S402 to repeat the operation.

(3) Operation of RIP Server

Next, the three operations of the RIP server 6 will be described. The operation when the inquiry A of whether the conversion is necessary or not is received from the printer 1 in step S403, the operation when the request C for transmission of the post-conversion page is received from the printer 1 in step S405, and the operation when the request D for the conversion is received from the printer 1 in step S406.

Figure 10:
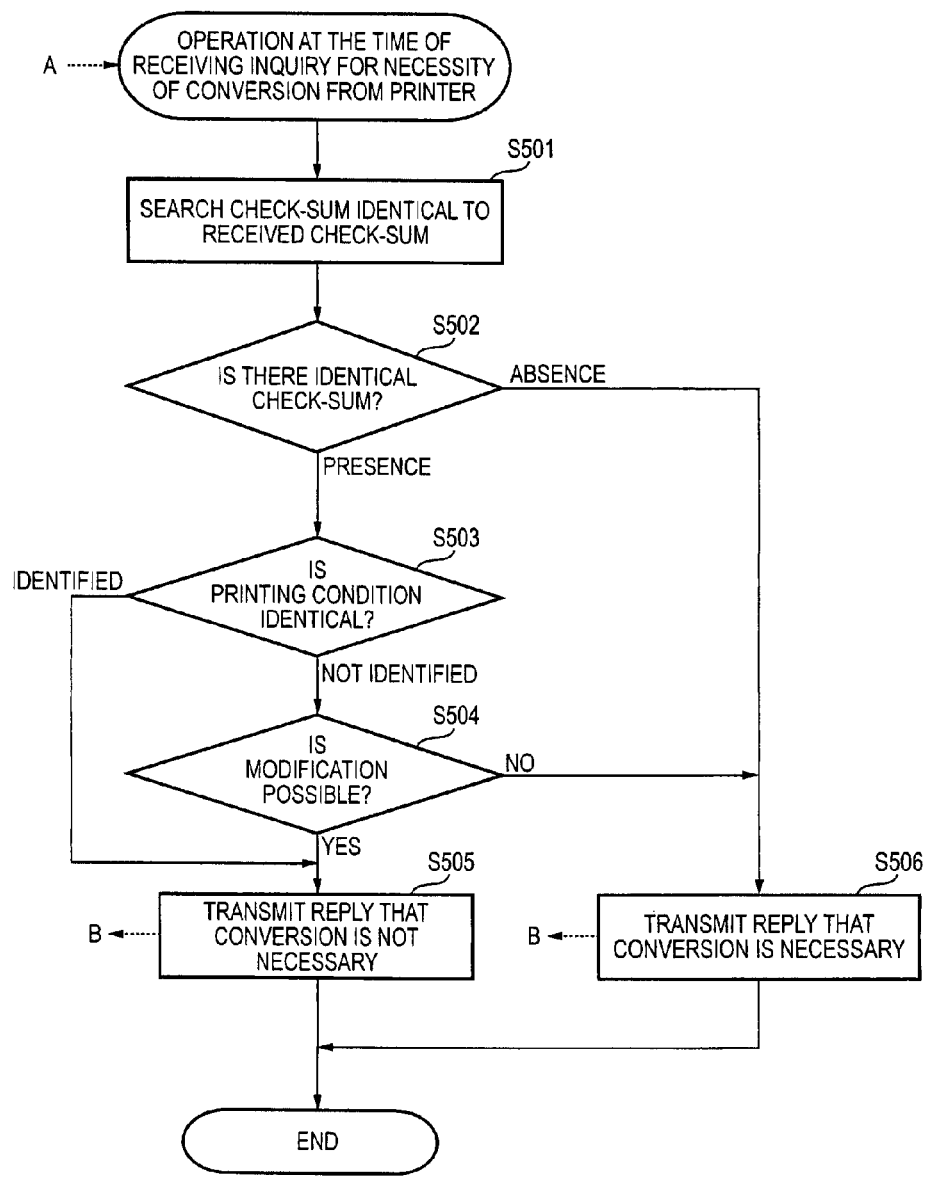
FIG. 10 is a flowchart illustrating a flow of the operation when the necessity of transmission of a post-conversion page is received from the printer.

(3-1) Operation when Inquiry a Of Whether Conversion is Necessary or not is Received from Printer First, the operation when the inquiry A of whether the conversion is necessary is received from the printer 1 in step S403 will be described with reference to FIG. 10. The inquiry includes the check-sum and the print condition, as described above. The operation of the RIP server 6 when the inquiry A of whether the conversion is necessary or not is received from the printer 1 in step S403 is one example of an correspondence information reception operation. Further, the following operation to be executed when the inquiry is received is one example of a reply operation.

In step S501, the CPU 21 (hereinafter, referred to as a conversion program) for executing the conversion program searches the check-sum identical to the check-sum received from the printer 1, among the check-sums stored in the memory 26.

In step S502, the conversion program determines whether there is the identical check-sum, as the search result in step S501. If there is the check-sum, it proceeds to step S503, and if there is no check-sum, it proceeds to step S506.

In step S503, the conversion program determines whether the print condition received from the printer 1 is identical to the print condition used for the post-conversion page corresponding to the check-sum to which the check-sum received from the printer 1 is identical. If it is not identical to each other, it proceeds to step S504, and if it is identical to each other, it proceeds to step S505.

In step S504, the conversion program determine whether it can be obtained by modifying to the same post-conversion page based on the print condition received from the printer 1, as the case where the pre-conversion page is received the post-conversion page, of which the check-sum is identical to the received check-sum. The conversion program proceeds to step S505 if it can be obtained by modifying, and proceeds to step S506 if it cannot be obtained by modifying.

In step S505, the conversion program transmits the reply B indicating the conversion being not necessary to the printer 1.

In step S506, the conversion program transmits the reply B indicating the conversion being necessary to the printer 1.

Figure 11:
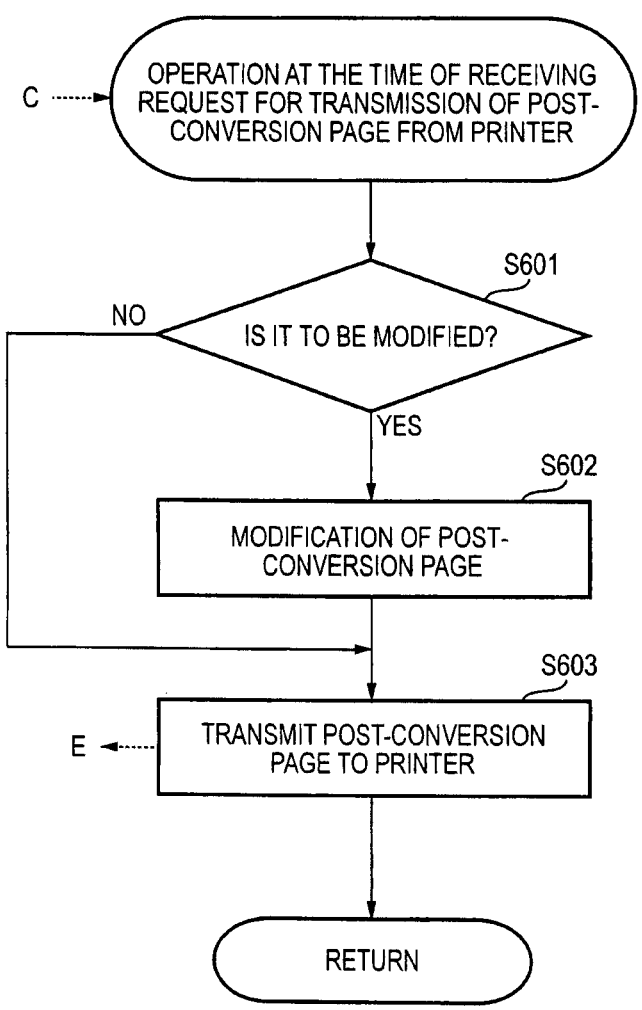
FIG. 11 is a flowchart illustrating a flow of the operation when a request for transmission of a post-conversion page is received from the printer.

(3-2) Operation when Request C for Transmission of Post-Conversion Page is Received from Printer Next, the operation when the request C for transmission of the post-conversion page is received from the printer 1 will be described with reference to FIG. 11.

In Step S601, the conversion program determines whether the data is to be modified based on the determine result in step S504. If the data is modified, it proceeds to step S602, and if the data is not modified, it proceeds to step S603.

In step S602, the conversion program modifies the post-conversion page corresponding to the check-sum, to which the check-sum received from the printer 1 is identical, based on the print condition received from the printer 1. For example, the operation equal to step S106 is carried out.

In step S603, the conversion program transmits the post-conversion page corresponding to the check-sum, to which the check-sum received from the printer 1 is identical, or the post-conversion page modified in step S602 to the printer 1, as the reply E to the request D. Step S603 is one example of the transmission operation.

(3-3) Operation when Request D for Conversion is Received from Printer

Figure 12:
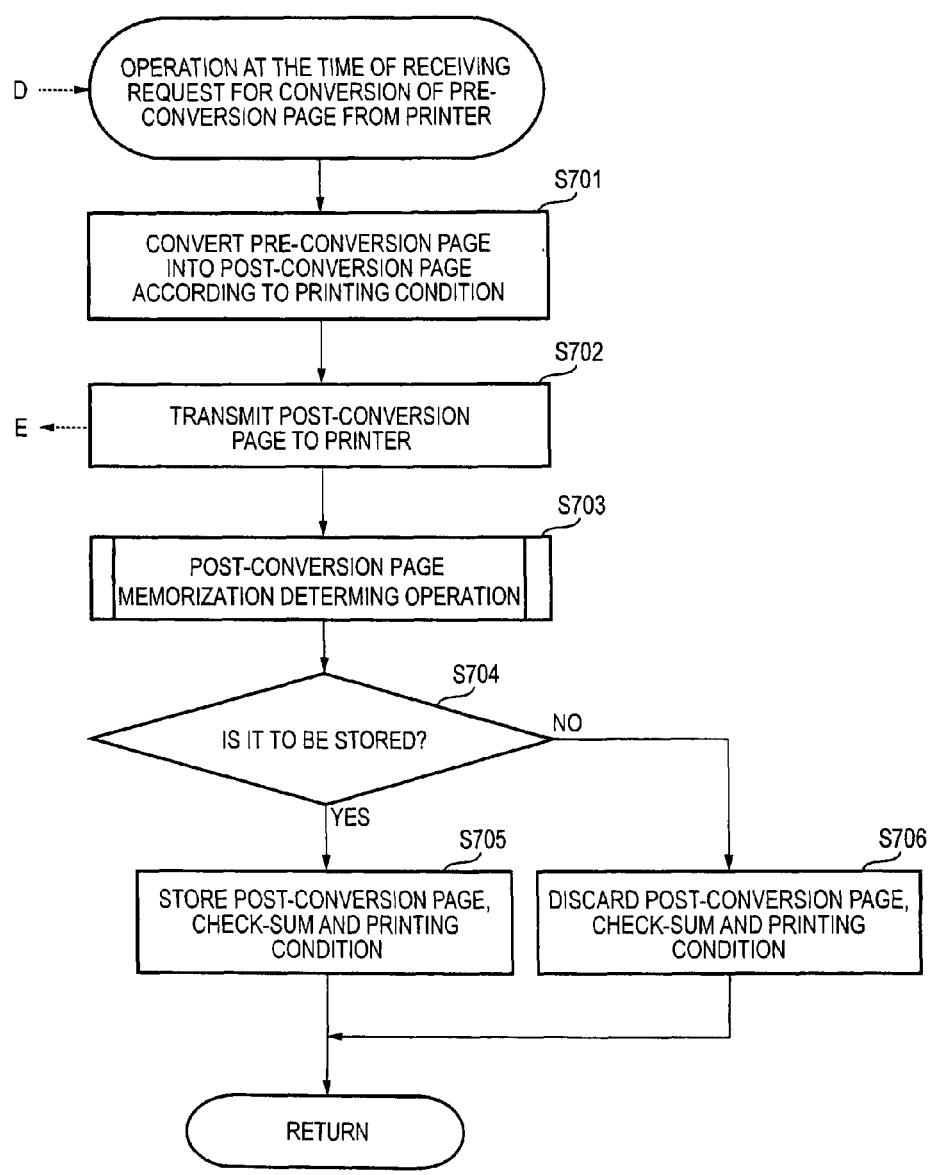
FIG. 12 is a flowchart illustrating a flow of the operation when a request for conversion of a pre-conversion page is received from the printer.

Next, the operation when the request D for the conversion is received from the printer 1 will be described with reference to FIG. 12. As described above, the request includes the post-conversion page, the check-sum, and the print condition. The operation of the RIP server receiving the request D for the conversion of the pre-conversion page from the printer 1 is one example of a pre-conversion page reception operation.

In step S701, the conversion program converts the pre-conversion page received from the printer 1 into the post-conversion page in accordance with the print condition received from the printer 1. Step S701 is one example of the conversion operation.

In step S702, the conversion program transmits the post-conversion page converted in step S701 to the printer 1, as the reply E to the request D. Step S702 is one example of the transmission operation.

In step S703, the conversion program executes the post-conversion page memorization determining operation. In the post-conversion page memorization determining operation according to the second illustrative embodiment, since the printer 1 does not acquires the time when the post-conversion page is transmitted to the RIP server 6, the communication time or the communication speed such as the post-conversion page memorization determining operation according to the first illustrative embodiment is not used as the determination reference. On the other hand, the data quantity of the post-conversion page can be acquired, only the data quantity of the post-conversion page may be used as the determination reference.

Additionally, the printer 1 transmits, to the RIP server 6, the time of starting the transmission of the pre-conversion page to the RIP server 6, and may use the difference between the transmitted time and the time when the reception of the pre-conversion page is completed in the RIP server 6, as the communication time. Alternatively, the communication speed may be determined using the time. In this case, the communication time or the communication speed may be also used as the determination reference.

In step S704, the conversion program determines whether the post-conversion page is stored, with reference to the post-conversion page memory flag set by the post-conversion page memorization determining operation carried out in step S703. If it is determined that the post-conversion page is stored, it proceeds to step S705. If it is determined that the post-conversion page is not stored, it proceeds to step S706.

In step S705, the conversion program stores the post-conversion page, the check cum received from the printer 1 and the print condition, with being corresponded to each other, in the memory 26. Step S705 is one example of the memorization operation.

In step S706, the conversion program discards the post-conversion data, the check-sum, and the print condition.

(4) Effect of Illustrative Embodiment

According to the printer 1 of the second illustrative embodiment, in the case where the user changes a portion of the pre-conversion page after the pre-conversion page configuring the print job is converted by the server, it is possible to suppress the load applied to the server, as compared with the case where all the pre-conversion page is transmitted to the server for re-conversion.

Further, according to the conversion program, in the case where the user changes a portion of the pre-conversion page after the pre-conversion page configuring the print job is converted by the server, it is possible to suppress the load applied to the server, as compared with the case where all the pre-conversion pages are transmitted to the server for re-conversion.

Other Illustrative Embodiments

This disclosure is not limited to the above illustrative embodiments in the above description and the drawings, and, for example, the following illustrative embodiments are included in this disclosure.

(1) In the above illustrative embodiment, the printer 1 has been described as an example of the image processing device. In contrast, the image processing device may be a facsimile (FAX) device. The FAX device converts the data into a format according to standards, such as G3, and then transmits it.

Further, the image processing device may be a so-called multi-functional peripheral including a printing function, a scanning function, a copying function, and a FAX function.

(2) In the above illustrative embodiment, the page has been described as an example of the pre-conversion partial data. In contrast, the pre-conversion partial data may be an object such as an image, a figure, and a character string.

(3) In the above illustrative embodiment, the case where the error detection code is used as the correspondence information has been described as an example. However, it is not limited to the error detection code. A information, in which if the correspondence information is information in which it becomes the same value if the contents of the page is identical to each other and it becomes a different value if the contents of the page is not identical to each other, can be applied.

The correspondence information may be not the information, in which it becomes a different value if the contents of the page are different, and may be information, in which the contents are same or different can be determined certainly in view of that a difference degree does not have any problem in practice. The degree. which does not have any problem in practice, can be appropriately determined.

In the above illustrative embodiment, the check-sum has been described as an example of the error detection code, but the error detection code is not limited to the check-sum. For example, the error detection code may be a Hash value calculated based on the contents of the pre-conversion page. Further, a combination of the check-sum and the Hash value may be used as the correspondence information.

(4) In the above illustrative embodiment, in the case where the modification is possible even if the print conditions are not identical to each other, a case where the pre-conversion page is not transmitted to the RIP server has been described as an example. In contrast, in the case where the print conditions are not identical each other, the pre-conversion page may be transmitted to the RIP server without determining whether the modification is possible.

(5) In the above illustrative embodiment, a case where the print job is transmitted from the information processing device 2 via the cloud print server 3 to the printer 1 has been described as an example. In contrast, the information processing device 2 may transmit the print job directly to the printer 1, without via the cloud print server 3.

(6) In the above illustrative embodiment, the case where the controller 10 includes one CPU has been described as an example. In contrast, the controller 10 may include a plurality of CPUs or an ASIC. Alternatively, the controller 10 may include at least one CPU and at least one ASIC.

(7) In the above illustrative embodiment, the RIP server 4 has been described as an example. However, a server which performs not only except for rasterisation, and also an operation such as format of file conversion is possible. For example, in the case where the printer 1 can interpret a JPEG file, but cannot interpret the PDF file, a file converting server capable of format-converting the PDF file into the JPEG file is possible, instead of the RIP server 4.

What is claimed is:

1. An image processing device comprising:
an acquisition unit configured to acquire an image processing job configured by at least one of pre-conversion partial data;
an image processing unit;
a communication unit configured to communicate with a server configured to convert the pre-conversion partial data into post-conversion partial data which is to be processed by the image processing unit;
a memory configured to store the post-conversion partial data and correspondence information that indicates a correspondence between the pre-conversion partial data used for conversion of the post-conversion partial data and the post-conversion partial data; and
a controller configured to:
    determine, with reference to the correspondence information, whether the post-conversion partial data corresponding to the pre-conversion partial data is stored in the memory, for each of the pre-conversion partial data configuring the image processing job acquired by the acquisition unit;
    transmit the pre-conversion partial data, which is determined that the corresponded post-conversion partial data is not stored in the memory, to the server;
    receive the post-conversion partial data from the server corresponding to the transmitted pre-conversion partial data;
    control the image processing unit to process the post-conversion partial data received from the server if the pre-conversion partial data is determined that the corresponded post-conversion partial data is not stored in the memory;
    control the image processing unit to process the post-conversion partial data stored in the memory if the pre-conversion partial data is determined that the corresponded post-conversion partial data is stored in the memory; and store the post-conversion partial data received from the server, and the correspondence information that indicates the correspondence between the pre-conversion partial data used for conversion of the post-conversion partial data and the post-conversion partial data.

2. The image processing device according to claim 1, wherein the correspondence information is an error detection code of the pre-conversion partial data.

3. The image processing device according to claim 1, wherein an image processing condition is set in the image processing job, wherein the server is configured to convert the pre-conversion partial data into the post-conversion partial data based on the image processing condition, and wherein the controller is further configured to:
  transmit the pre-conversion partial data and the image processing condition to the server;
  store the post-conversion partial data received from the server and the image processing condition, with being corresponded to each other;
  determine whether the image processing condition set in the image processing job is identical to the image processing condition correspondingly stored with the post-conversion partial data which is corresponding to the pre-conversion partial data configuring the image processing job; and
  transmit, even if it is determined that the post-conversion partial data is stored, the pre-conversion partial data and the image processing condition to the server in the communication operation, if it is determined that the image processing condition is not identical to each other.

4. The image processing device according to claim 3, wherein the controller is further configured to:
  determine, if it is determined that the image processing condition is not identical to each other, whether the image processing condition set in the image processing job is an image processing condition, in which the same post-conversion partial data as a case where the pre-conversion partial data and the image processing condition are transmitted to the server is obtained by modifying the post-conversion partial data based on the image processing condition;
  modify the post-conversion partial data based on the image processing condition set in the image processing job in the control operation, even if it is determined that the image processing condition is not identical to each other, if it is determined in the modification determining operation that it is the image processing condition capable of obtaining the post-conversion partial data; and
  control the image processing unit to process the modified post-conversion partial data.

5. The image processing device according to claim 1, wherein the controller is further configured to:
  measure a time from when the pre-conversion partial data is transmitted to the server to when the post-conversion partial data is received from the server;
  determine whether the communication time is equal to or less than a reference time, and
  store the post-conversion partial data if it is determined that the communication time is greater than the reference time; and
  delete the post-conversion partial data if it is determined that the communication time is equal to or less than the reference time.

6. The image processing device according to claim 1, wherein the controller is further configured to:
determine whether a data quantity of the post-conversion partial data is equal to or less than a reference data quantity;
store the post-conversion partial data if it is determined that the data quantity of the post-conversion partial data is greater than the reference data quantity; and
delete the post-conversion partial data if it is determined that the data quantity of the post-conversion partial data is equal to or less than the reference data quantity.

7. The image processing device according to claim 1, wherein the controller is further configured to:
  measure a communication speed of a communication line between the image processing device and the server; and
  determine whether the communication speed is equal to or more than a reference speed; and
  store the post-conversion partial data if the communication speed measured by the communication speed measuring operation is greater than the reference speed delete the post-conversion partial data if the communication speed measured by the communication speed measuring operation is equal to or more than the reference speed.

* * * * *